No. 618,533. Patented Jan. 31, 1899.
W. J. BLOCKER.
SOD OR TURF CUTTING ATTACHMENT FOR PLOWS.
(Application filed July 19, 1898.)
(No Model.)

Witnesses William J. Blocker, Inventor.
By his Attorneys,
C. A. Snow & Co.

THE NORRIS PETERS CO., PHOTO-LITHO., WASHINGTON, D. C.

UNITED STATES PATENT OFFICE.

WILLIAM JOHN BLOCKER, OF LYONS, TEXAS.

SOD OR TURF CUTTING ATTACHMENT FOR PLOWS.

SPECIFICATION forming part of Letters Patent No. 618,533, dated January 31, 1899.

Application filed July 19, 1898. Serial No. 686,359. (No model.)

*To all whom it may concern:*

Be it known that I, WILLIAM JOHN BLOCKER, a citizen of the United States, residing at Lyons, in the county of Burleson and State of Texas, have invented a new and useful Sod or Turf Cutting Attachment for Plows, of which the following is a specification.

My invention relates to improvements in sod or turf attachments for plows; and the primary object that I have in view is to provide an attachment which may be used on different kinds of plows for cutting with ease through roots and tough sod—such as sod embedded with Johnson grass, wire-grass, or Bermuda grass—thereby easing the draft on the implement and enabling the operator to plow the ground quickly without the necessity of withdrawing the implement from the ground when a root is encountered unless it should happen to be a particularly large root.

A further object of the invention is to provide an attachment in which the cutter-bar and its brace are secured firmly to parts of an ordinary plow without the liability of the joints becoming clogged or filled with earth to hinder the progress of the implement through the ground and increase the draft.

With these ends in view the invention consists in the novel construction and arrangement of parts, which will be hereinafter fully described and claimed.

To enable others to understand the invention, I have illustrated the preferred embodiment thereof in the accompanying drawings, forming a part of this specification, and in which—

Figure 1:
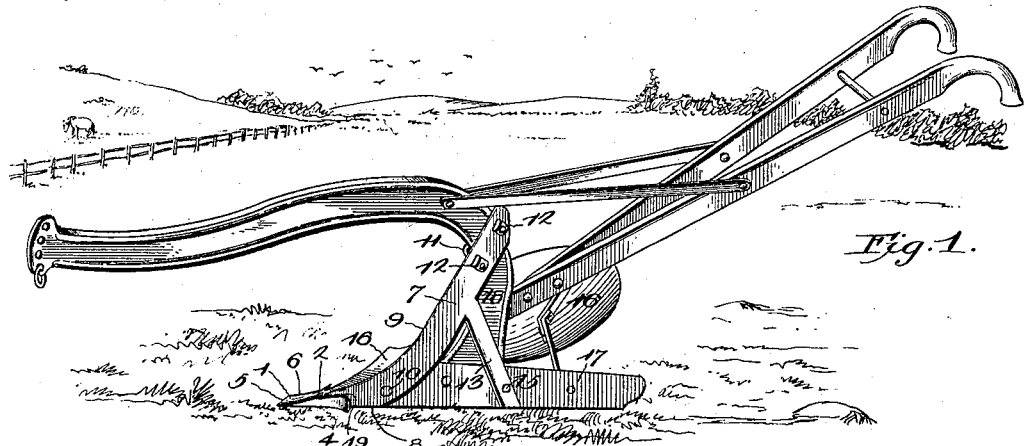
Figure 2:
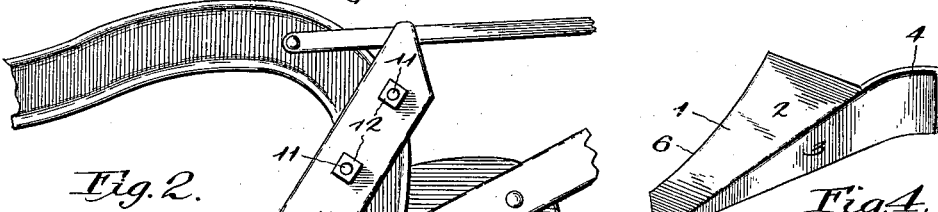
Figure 4:
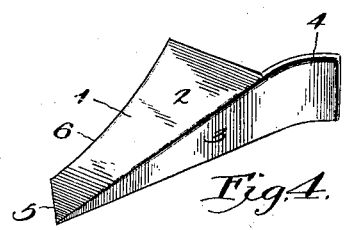
Figure 3:
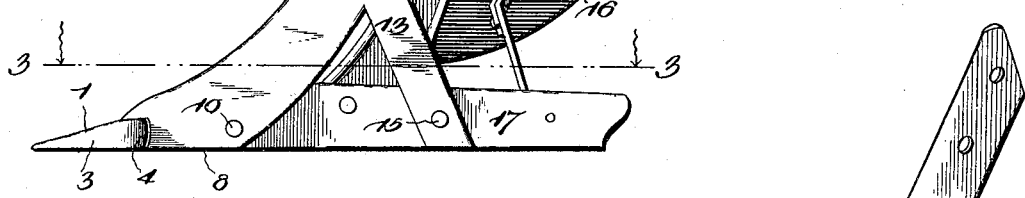
Figure 5:
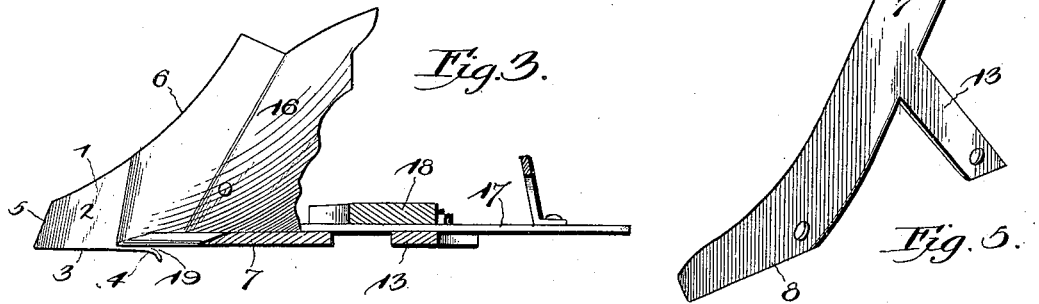
Figure 5:
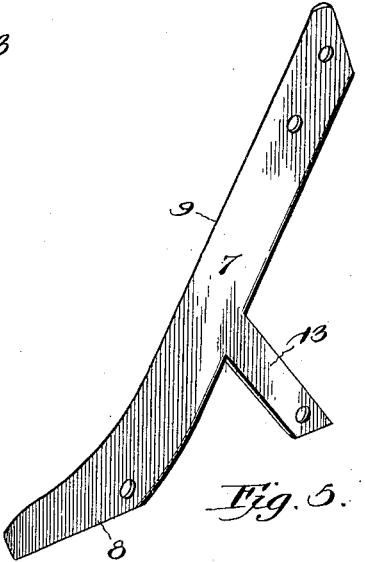

Figure 1 is a perspective view of an ordinary plow with my cutter attachment fitted thereto. Fig. 2 is a side elevation of the implement with the cutter attachment in position thereon, looking at the landside of the plow. Fig. 3 is a horizontal cross-sectional view through an implement with my cutter attachment thereon and on the plane indicated by the dotted line 3 3 of Fig. 2. Fig. 4 is a detail perspective view of the insertible point forming a part of my invention. Fig. 5 is a detail perspective view of the cutter-bar.

Like numerals of reference denote like and corresponding parts in each of the several figures of the drawings.

1 designates the insertible point, which is adapted to be fitted to the lower edge of the share and landside of any ordinary kind of plow. This point 1 is cast or otherwise formed in a single piece of metal to produce the sloping face 2 and the vertical landside 3, and as a part of this single metallic point 1 I make the wing 4 integral with the landside-flange 3. This wing is extended rearwardly from the landside of the point and it is inclined or deflected laterally with respect to the plane of the landside-flange 3, so that the rear end of the deflected wing 4 extends in rear of the point 1 and adjacent to the plow-landside when the point 1 is properly fitted to the plow. The insertible point 1 is shaped or fashioned to produce the pointed front edge 5 and the sloping or curved side edge 6, which when the point is properly adjusted and secured forms a continuation of the outer edge of the share or moldboard.

The cutter-bar 7 of my attachment is a single piece of metal adapted to be arranged in a vertically-inclined position, so as to have its lower edge overlap the landside of a plow and its upper end to bear laterally against the foot or stock of the plow-beam, and this cutter-bar has its lower extremity received within the socket or space which is formed between the landside and the deflected wing 4 of the insertible point. The lower edge 8 of the vertically-inclined cutter-bar is at a tangent to the inclined working edge 9 of the cutter-bar, and said bar is fitted laterally against the landside to have said edge 8 thereof lie parallel with the lower edge of the landside. Said lower end of the cutter-bar is firmly secured to the landside by a transverse bolt 10, which passes through said cutter-bar and the landside, while the upper end of the cutter-bar, which overlaps the foot or stock of the plow-beam, is firmly secured thereto by a yoke 11, the legs of which pass through suitable apertures in the cutter-bar, while the head of the yoke embraces the foot or stock, the threaded extremities of the yoke-legs receiving the nuts 12, adapted to bear against the cutter-bar, and thereby firmly draw the foot or stock and the cutter-bar into intimate engagement. This inclined cutter-bar has its front edge beveled or sharpened from the point where it emerges from the space provided by the inclined wing 4 and the landside of the plow up to the point where said edge of the cutter-bar crosses the foot or stock of the beam; but the length of this cutting edge 9 of said bar 7 is not material so long as the lower part of the cutter-bar is formed with said cutting edge to sever the roots and the turf or sod.

The cutter-bar is braced at a point intermediate of its attachment to the landside and the stock or foot by a brace or strut 13, which is inclined reversely to the angle of the cutter-bar to the landside, and the upper end of which brace is firmly united—as, for instance, by welding the brace to the cutter-bar—while the lower end of the brace is removably secured to the landside by a bolt 15, which passes through said brace and landside.

In order that others skilled in the art may understand the mode of applying and using my invention, I have shown the same fitted to an ordinary plow by Figs. 1, 2, and 3 of the drawings, on reference to which figures it will be seen that the ordinary moldboard or share is indicated by the numeral 16, the landside at 17, and the stock or foot at 18.

In applying my attachment to such a plow as represented by the drawings the point 1 is fitted operatively to the lower edge of the share or moldboard, so as to have its edge 6 form a continuation of the lower edge of said share and to bring the landside-flange 3 substantially in alinement or flush with the landside 17. The assemblage of the point to the plow causes the deflected wing 4 to stand off from the landside 17, thereby providing a pocket or recess 19 between the landside and the wing. The cutter-bar is adjusted to have its lower end fit adjacent to the landside, with its front edge contained within the pocket or recess 19, while the upper end of said cutter-bar is lapped against or over the stock 18. The clamping-yoke 11 and the bolt 10 are now fitted to secure the cutter-bar to the stock and the landside, respectively, and the bolt 15 passes through the brace 13 and the landside. The cutter-bar is thus firmly secured in position on the plow, so as to present a sharpened cutting edge in an inclined position through the sod and turf and the roots, and this inclination of the cutting edge is advantageous because the implement is made to quickly and easily sever the roots, thus easing the draft of the plow. The inclined or deflected wing 4, arranged to overlap the front lower extremity of the cutter-bar, is an important feature of my invention, because it protects the cutter-bar from accumulations of dirt in the space between the cutter-bar, the landside, and the point, and this deflected wing also serves to clear the path for the bolts 10 and 15, so that lodgment of the dirt against the landside at the points where the cutter-bar and brace overlap the same is reduced to a minimum.

It is evident that changes in the form and proportion of parts may be made by a skilled mechanic without departing from the spirit or sacrificing the advantages of the invention.

Having thus described the invention, what I claim is—

1. In a cutting attachment for plows, the combination of a point having a wing, and an upright cutter-bar with its lower end housed or confined within said wing, substantially as described.

2. In a cutting attachment for plows, the combination of a point provided on its landside with a deflected wing adapted to form a space between itself and the plow-landside, and a cutter-bar fitted in said space between the landside and said deflected wing to be protected by the latter from accumulations of dirt at the joint between the cutter-bar and the landside, substantially as described.

3. The combination of a point provided with a deflected wing at the heel of its landside and an inclined cutter-bar provided on its front edge with a cutting edge and having its lower forward extremity overlapped by the deflected wing of said point, substantially as described.

4. The combination with a share or moldboard and the landside of an ordinary plow, of the insertible point secured removably to the share and provided with a landside-flange, an inclined cutter-bar fitted at its lower end to the landside in rear of the flange of said point, and a brace united to the cutter-bar and secured removably to the landside, substantially as described.

5. In a cutting attachment for plows, the combination with a landside and a stock, of the flanged point secured or united to the share and landside and provided at its heel with a deflected wing, an inclined cutter-bar provided with a front cutting edge and having its upper and lower edges lapped against the stock and the landside respectively, a yoke which unites the upper end of the cutter-bar to the stock, a brace united to the cutter-bar and overlapping the landside, and bolts which unite the lower ends of the cutter-bar and the brace to the landside and which bolts lie in substantially the horizontal plane of the deflected wing on the point, substantially as described.

In testimony that I claim the foregoing as my own I have hereto affixed my signature in the presence of two witnesses.

WILLIAM JOHN BLOCKER.

Witnesses:
R. F. PALANSKY,
JOHN TILLER.